US010074951B2

(12) United States Patent
Seki et al.

(10) Patent No.: US 10,074,951 B2
(45) Date of Patent: Sep. 11, 2018

(54) COMMUTATOR, MOTOR, AND MANUFACTURING METHOD OF COMMUTATOR

(71) Applicant: ASMO CO., LTD., Kosai, Shizuoka-pref. (JP)

(72) Inventors: Akihiko Seki, Toyokawa (JP); Yasuhiro Kanematsu, Toyohashi (JP); Noriyasu Nishio, Kosai (JP); Norifumi Suzuki, Hamamatsu (JP); Tsuyoshi Suzuki, Toyohashi (JP); Kazuo Kato, Toyokawa (JP); Toshiyuki Natsume, Toyohashi (JP); Kenichi Sugibayashi, Kosai (JP)

(73) Assignee: ASMO CO., LTD., Kosai (JP)

( * ) Notice: Subject to any disclaimer, the term of this patent is extended or adjusted under 35 U.S.C. 154(b) by 424 days.

(21) Appl. No.: 15/049,150

(22) Filed: Feb. 22, 2016

(65) Prior Publication Data

US 2016/0254630 A1    Sep. 1, 2016

(30) Foreign Application Priority Data

Feb. 27, 2015   (JP) ................................ 2015-039459

(51) Int. Cl.
*H01R 39/32* (2006.01)
*H01R 43/06* (2006.01)
*H02K 13/04* (2006.01)

(52) U.S. Cl.
CPC ............. *H01R 43/06* (2013.01); *H02K 13/04* (2013.01)

(58) Field of Classification Search
CPC ........ H02K 27/02; H02K 13/14; H02K 13/04; H02K 23/36; H02K 13/006; H02K 13/10
USPC ................................. 310/234, 124, 151, 225
See application file for complete search history.

(56) References Cited

U.S. PATENT DOCUMENTS

| | | | |
|---|---|---|---|
| 2004/0108787 A1* | 6/2004 | Terada | H01R 43/08 310/204 |
| 2007/0046134 A1* | 3/2007 | Nakano | H01R 39/04 310/234 |
| 2007/0069603 A1* | 3/2007 | Terada | H02K 23/38 310/234 |

(Continued)

FOREIGN PATENT DOCUMENTS

JP          2005-341654 A       12/2005

*Primary Examiner* — Thanh Lam
(74) *Attorney, Agent, or Firm* — Solaris Intellectual Property Group PLLC

(57) ABSTRACT

A commutator includes an insulating section that is formed in a tube shape including a shaft insertion hole through which a shaft is inserted, and that is formed with an indented portion in an end portion at one side in an axial direction of the shaft. The commutator also includes plural segments that are supported by an outer peripheral portion of the insulating section, that are arrayed around a circumferential direction of the insulating section with spacings therebetween, and that are each provided with an anchor portion at an end portion at the one side in the axial direction of the shaft. The commutator also includes a first, second, third short-circuit wires, each connecting the anchor portion of respective one segment to the anchor portion of respective another segment, and at least a portion being disposed inside the indented portion formed at the insulating section.

10 Claims, 15 Drawing Sheets

(56) References Cited

U.S. PATENT DOCUMENTS

| | | | |
|---|---|---|---|
| 2008/0093947 A1* | 4/2008 | Aoyama | H02K 23/32 |
| | | | 310/197 |
| 2008/0122303 A1* | 5/2008 | Santo | H02K 5/148 |
| | | | 310/51 |
| 2008/0265708 A1* | 10/2008 | Aoyama | H01R 39/04 |
| | | | 310/236 |
| 2015/0130329 A1* | 5/2015 | Kawashima | H02K 23/32 |
| | | | 310/68 C |

* cited by examiner

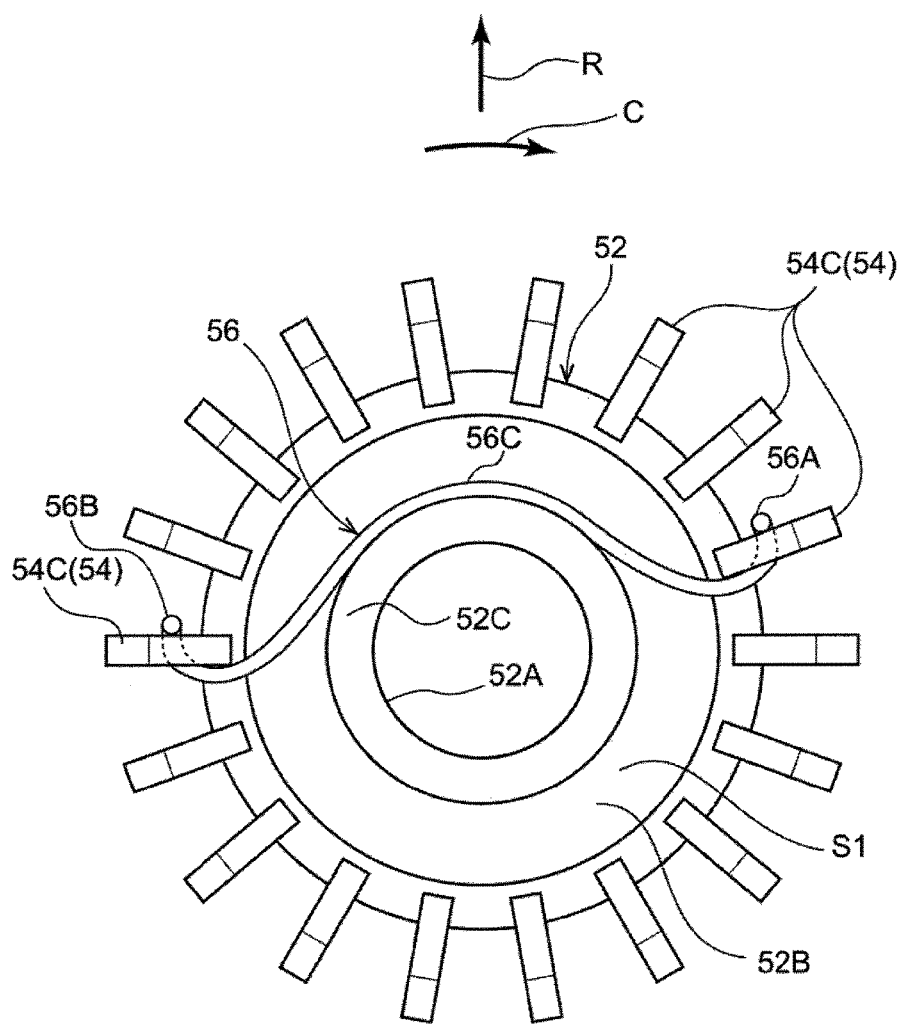

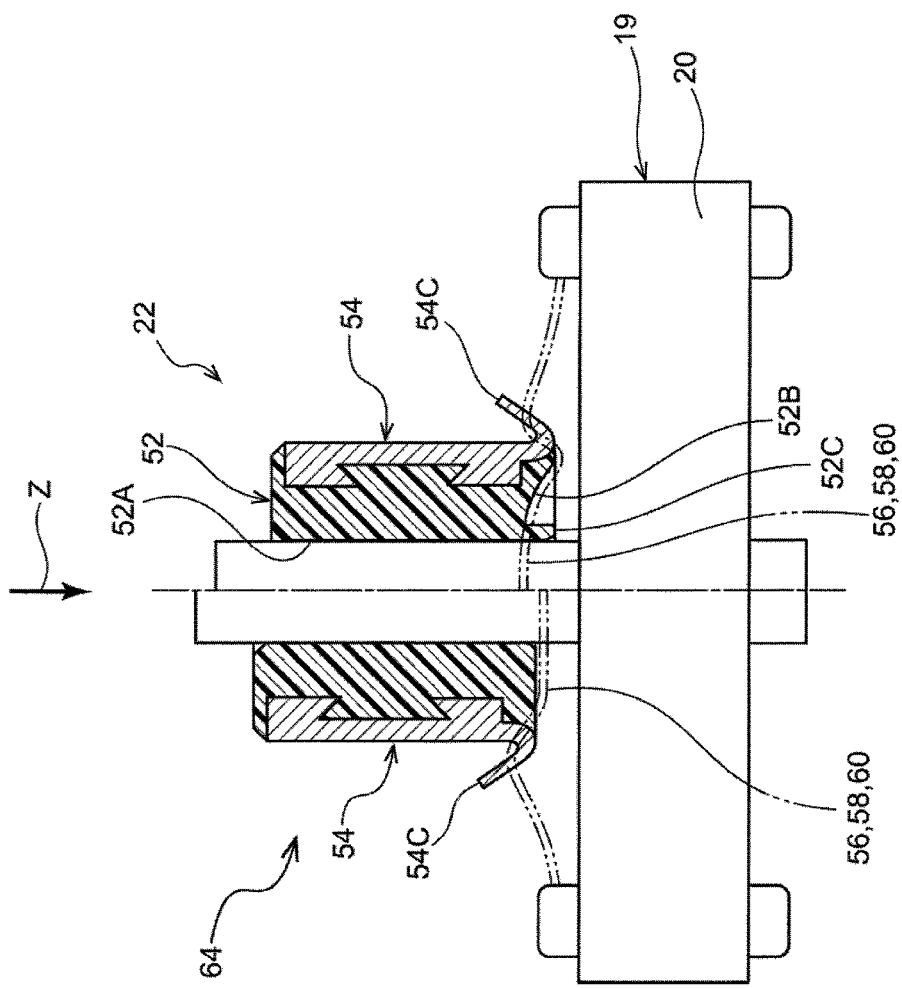

COMMUTATOR, MOTOR, AND MANUFACTURING METHOD OF COMMUTATOR

CROSS-REFERENCE TO RELATED APPLICATION

This application claims priority under 35 USC 119 from Japanese Patent Application No. 2015-039459 filed Feb. 27, 2015, the disclosure of which is incorporated by reference herein.

BACKGROUND

Field of the Invention

The present invention relates to a commutator, a motor, and a commutator manufacturing method.

Related Art

Japanese Patent Application Laid-Open (JP-A) No. 2005-341654 describes a DC motor including a rotor including a commutator that brushes sliding contact, and a stator including magnets that are disposed facing the rotor. In a case in which there are plural poles as number of magnetic poles of the magnets configuring the stator, the same number of brushes are conceivably required as the number of magnetic poles of the magnets, here, the number of brushes can be reduced by providing a short-circuit wire between segments of the same polarity in the commutator.

However, when the short-circuit wire that connects between segments is provided, a space for providing the short-circuit wire needs to be provided between the commutator and the armature, as a result, there is an hindrance to reducing the size of the rotor in the axial direction, and it is therefore conceivable that reducing the size of a motor in the axial direction is also hindered.

SUMMARY

In consideration of the above circumstances, a commutator, a motor, and a manufacturing method of the commutator are obtained that are capable of achieving a reduction in size of a rotor and the motor in an axial direction.

A commutator of a first aspect includes: an insulating section that is formed in a tube shape and that includes a shaft insertion hole through which a shaft is inserted, an indented portion being formed at an end portion of the insulating section, which is at one side in an axial direction of the shaft; a plurality of segments that are supported at an outer peripheral portion of the insulating section and that are arrayed with a spacing from each other along a circumferential direction of the insulating section, an anchor portion being provided at an end portion of each of the segments, which is at the one side in the axial direction of the shaft; and a short-circuit wire that connects the anchor portion of one of the segments and the anchor portion of another one of the segments, at least a portion of the short-circuit wire being disposed inside the indented portion.
(In other words, a commutator of a first aspect includes: an insulating section that is formed in a tube shape and that includes a shaft insertion hole through which a shaft is inserted, an indented portion being formed at an end portion of the insulating section, which is at one side in an axial direction of the shaft; a plurality of segments that are supported at an outer peripheral portion of the insulating section and that are arrayed with a spacing from each other along a circumferential direction of the insulating section, an anchor portion being provided at an end portion of each of the segments, which is at the one side in the axial direction of the shaft; and a first short-circuit wire that connects a first anchor portion of a first segment among the segments and a second anchor portion of a second segment among the segments, at least a portion of the first short-circuit wire being disposed inside the indented portion).

In the commutator of the first aspect, at least the portion of the short-circuit wire that connects the anchor portion of the one segment and the anchor portion of the another segment is disposed inside the indented portion formed at the insulating section. This enables a space in which the short-circuit wire is disposed, between an armature and the commutator attached to the shaft, to be reduced. Namely, the insulating section of the commutator and the armature can be disposed closer to each other. This enables a rotor and a motor configured including the commutator of the present aspect to be reduced in size in the axial direction.

A commutator of a second aspect is the commutator of the first aspect, wherein: a plurality of short-circuit wires are provided; and at least portions of the respective plurality of the short-circuit wires are disposed overlapping in at least one direction of the axial direction or a radial direction of the shaft, inside the indented portion.
(In other words, a commutator of a second aspect further includes a second short-circuit wire that connects a third anchor portion of a third segment among the segments and a fourth anchor portion of a fourth segment among the segments, at least a portion of the second short-circuit wire being disposed inside the indented portion, wherein at least a portion of the first short-circuit wire and at least a portion of the second short-circuit wire are disposed overlapping inside the indented portion, in at least one direction of the axial direction or a radial direction of the shaft.)

In the commutator of the second aspect, at least the portion of each of the plural short-circuit wires is disposed as described above, thereby enabling the space factor of the short-circuit wires inside the indented portion of the insulating section to be higher (improved).

A motor of a third aspect includes: an armature that includes an armature core fixed to a shaft, and a coil that is formed by a conductive winding being wound about a specific location of the armature core; and a commutator of the first aspect or the second aspect, to which a terminal portion of the winding forming the coil is connected.

The motor of the third aspect is configured including the commutator of the first aspect or the second aspect, thereby enabling the motor to be reduced in size in the axial direction.

A commutator manufacturing method of a fourth aspect, applied when manufacturing the commutator of the first aspect or the second aspect, includes: a short-circuit wire anchoring process of anchoring one end portions and other end portions of the short-circuit wires to the respective anchor portions of the segments; and a short-circuit wire pressing process of disposing the at least a portion of each of the respective short-circuit wires inside the indented portion, by pressing locations between the one end portions and the other end portions of the short-circuit wires toward an indented portion side by using a jig, after performing the short-circuit wire anchoring process.

In the commutator manufacturing method of the fourth aspect, after the one end portions and the another end portions of the plural short-circuit wires have been anchored to the anchor portions of the plural segments, at least a portion of each of the plural short-circuit wires can be collectively (together) disposed inside the indented portion formed at the insulating section. This enables the process in which at least a portion of each of the plural short-circuit wires is disposed inside the indention portion to be simplified.

A commutator manufacturing method of a fifth aspect, applied when manufacturing the commutator of the first aspect or the second aspect, includes: a jig placement process of disposing a leading end portion of a jig inside the indented portion; a short-circuit wire anchoring process of anchoring one end portions and other end portions of the short-circuit wires to the respective anchor portions of the segments, while causing locations between the one end portions and the other end portions of the short-circuit wires to abut the jig; and, a jig separation process of moving the jig in a direction away from the indented portion after performing the short-circuit wire anchoring process.

In the commutator manufacturing method of the fifth aspect, after having disposed the leading end portion of the jig inside the indented portion, the one end portions and the another end portions of the short-circuit wires are anchored to the anchor portions of the segments, while the locations between the one end portions and the another end portions of the short-circuit wires are caused to abut the jig and a specific tension is applied. By moving the jig away from the indented portion, a state is provided in which one segment and another segment are connected by each short-circuit wire, in a state in which at least a portion of each of the short-circuit wires is disposed inside the indented portion. The above manufacturing processes make it easier to adjust tension occurring in the short-circuit wires, thereby enabling excessive elongation of the short-circuit wires and deformation of the anchor portions of the segments to be suppressed.

A commutator manufacturing method of a sixth aspect is the commutator manufacturing method of the fifth aspect, wherein in the short-circuit wire anchoring process, the locations between the one end portions and the other end portions of the short-circuit wires are disposed overlapping in a radial direction of the shaft.

The commutator manufacturing method of the sixth aspect enables the space factor in the radial direction of the short-circuit wires inside the indented portion of the insulating section to be higher (improved).

A commutator manufacturing method of a seventh aspect is the commutator manufacturing method of the sixth aspect, wherein the short-circuit wire anchoring process is performed in a state in which, in the jig placement process, a clearance corresponding to a wire diameter of the short-circuit wire is provided between the jig and the indented portion.

In the commutator manufacturing method of the seventh aspect, the clearance corresponding to the wire diameter of the short-circuit wires is provided between the jig and the indented portion, thereby enabling the locations between the one end portions and the another end portions of the plural short-circuit wires to be easily routed (disposed) in a state overlapping each other in the radial direction of the shaft.

The commutator, the motor, and the commutator manufacturing method of the aspects obtain an excellent advantageous effect of enabling a reduction in size of the rotor and the motor in the axial direction.

BRIEF DESCRIPTION OF THE DRAWINGS

Exemplary embodiment will be described in detail with reference to the following figures, wherein:

FIG. 6B is a plan view illustrating the first short-circuit wire and so on, after the process illustrated in FIG. 6A has been performed;

FIG. 9 is a side cross-section comparing a rotor of an exemplary embodiment and a rotor according to a comparative example.

DETAILED DESCRIPTION

Figure 1:
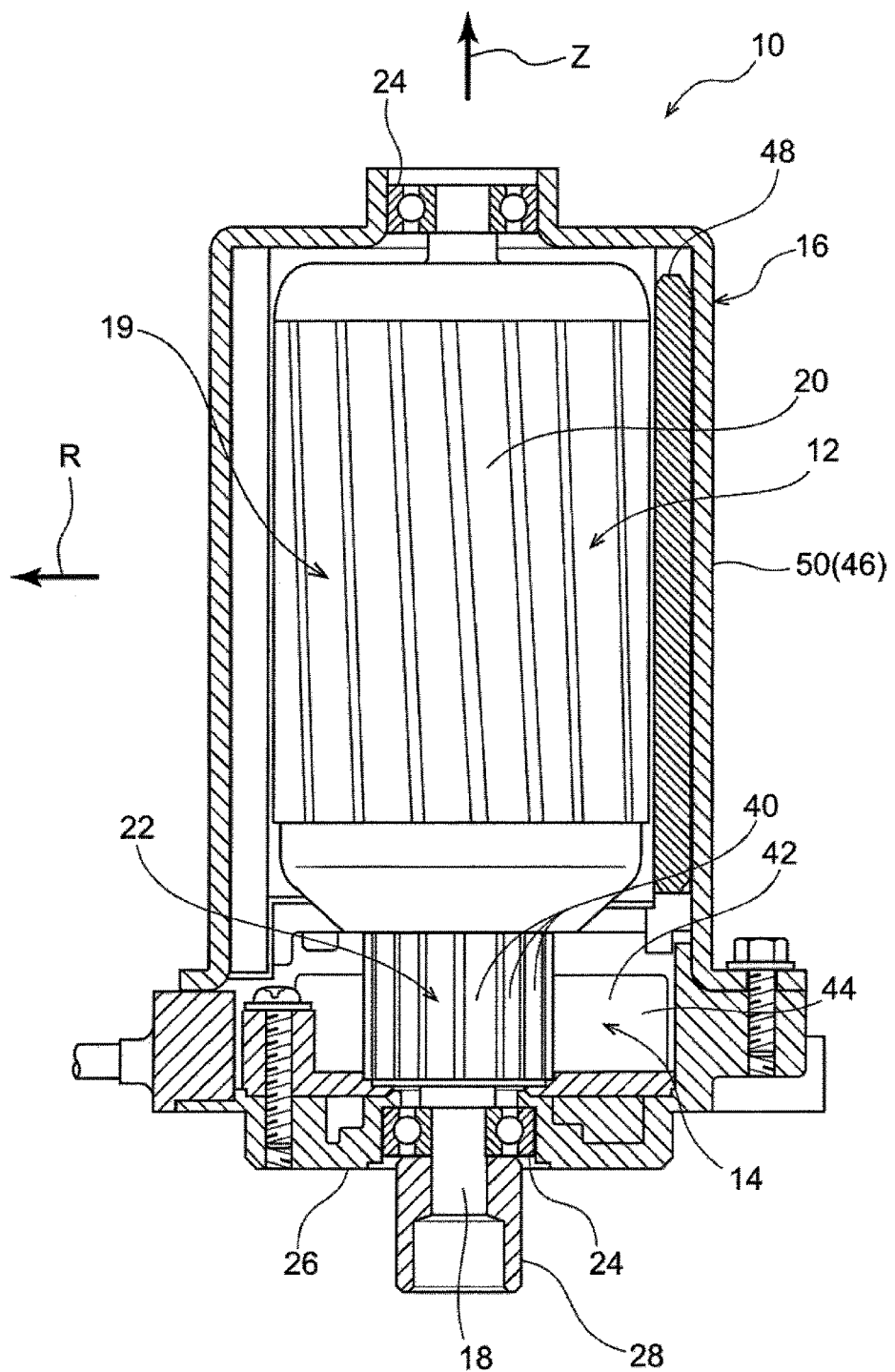
FIG. 1 is a side cross-section illustrating a DC motor.

Explanation follows regarding a DC motor according to an exemplary embodiment, with reference to FIG. 1 to FIG. 8B. Note that in the drawings, the arrow Z direction, the arrow R direction, and the arrow C direction respectively indicate an axial direction, a radial direction, and a circumferential direction of a shaft of a DC motor, as appropriate. Unless specifically stated otherwise, simple reference to the axial direction, the radial direction, and the circumferential direction below refers to the axial direction, the radial direction, and the circumferential direction of the shaft of the DC motor.

As illustrated in FIG. 1, a DC motor 10 serving as a motor includes a rotor 12, a brush device 14, and a stator 16.

The rotor 12 is configured including a shaft 18 formed in a rod shape, and an armature 19 and a commutator 22 that are fixed to the shaft 18. The shaft 18 is disposed coaxially to a yoke housing 46 which will be described later. One axial direction end portion of the shaft 18 is supported so as to be capable of rotation by a bottom portion of the yoke housing 46 via a shaft receiving (bearing) member 24, and another axial direction end portion of the shaft 18 is supported so as to be capable of rotation by motor housing 26, also via a shaft receiving (bearing) member 24. A coupling member 28 is press-fit into the another axial direction end portion of the shaft 18.

The armature 19 is configured including an armature core 20 that is fixed to the shaft 18 by, for example, press-fitting an axial center portion thereof into the shaft 18, and plural coils that each is formed by winding a conductive winding (wire) at specific location of the armature core 20. A terminal portion of each winding forming the coil is connected to the commutator 22, described in detail later.

The brush device 14 is disposed at the radial direction outside of the commutator 22. The brush device 14 is configured including a brush holder 42 formed using an insulating material, and a pair of brushes 44 that are supported by the brush holder 42. The pair of brushes 44 are urged toward the radial direction inside by spring, not illustrated in the drawings. The pair of brushes 44 thereby make sliding contacting with the commutator 22, enabling current flowing (energizing) to the coils of the armature 19. One brush 44 is disposed at the same position in the circumferential direction as a magnetic pole center of an N pole magnet 48, described later, and another brush 44 is disposed at the same position in the circumferential direction as a magnetic pole center of an S pole magnet 48, also described later.

The stator 16 is configured including the yoke housing 46 formed in a bottomed tube shape, covering the armature core 20, and the plural magnets 48 that are fixed to the yoke housing 46. The yoke housing 46 includes a tube shaped section 50 disposed facing the armature core 20 along the circumferential direction. The N pole magnets 48 and the S pole magnets 48 are joined, using adhesive or the like, to an inner peripheral face of the tube shaped section 50, in a state disposed alternately around the circumferential direction.

Explanation follows regarding configuration of the commutator 22, this being a main portion of the present exemplary embodiment.

Figure 2:
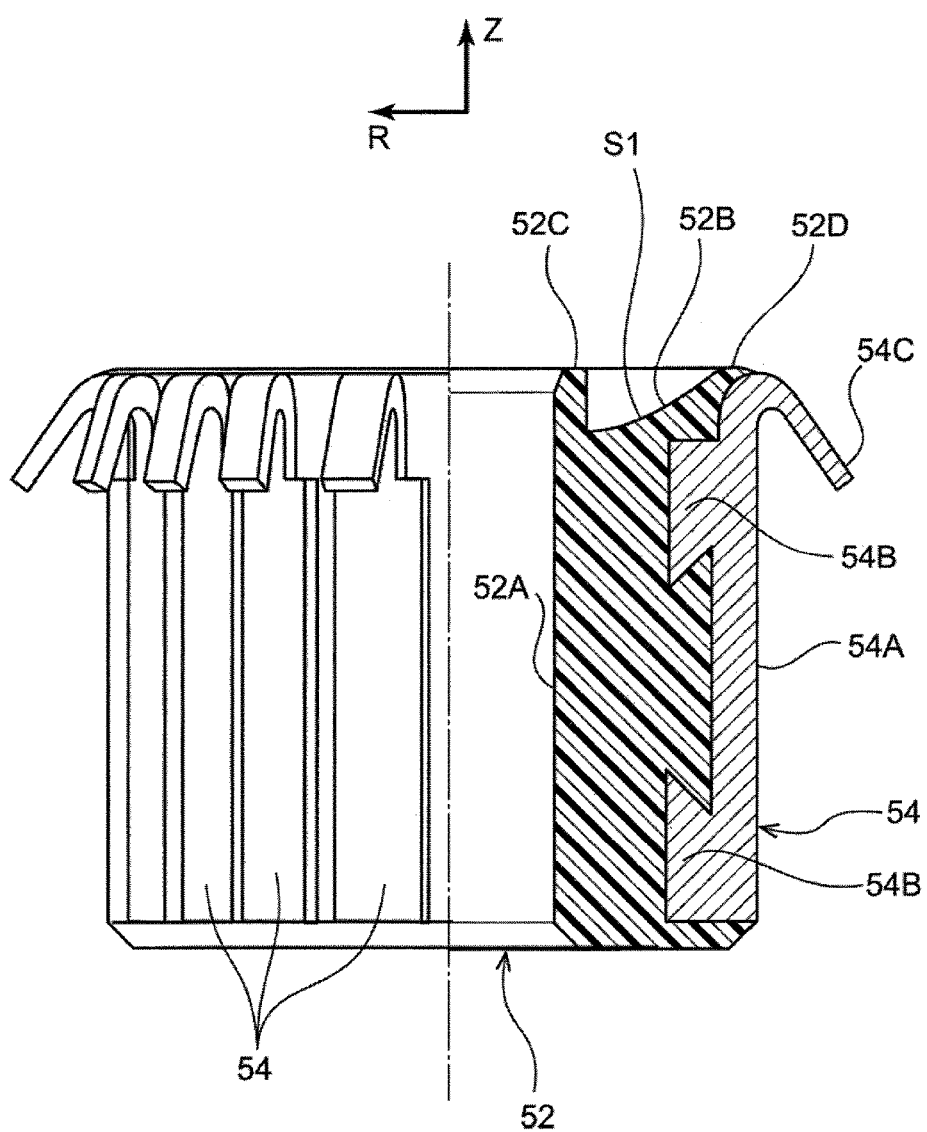
FIG. 2 is a partial side cross-section illustrating an insulating section and segments of a commutator.

As illustrated in FIG. 1, the commutator 22 is fixed to a portion at the another axial direction end side of the shaft 18 in a state disposed adjacent to, in the axial direction, the armature 19. As illustrated in FIG. 2, the commutator 22 includes an insulating section 52 that is formed using an insulating material and is fixed to the shaft 18 (see FIG. 1), plural segments 54 that are supported at an outer peripheral portion of the insulating section 52, and a first short-circuit wire 56, a second short-circuit wire 58, and a third short-circuit wire 60, each serving as a short-circuit wire that connects one segment 54 to another segment 54 (see FIG. 5B).

The insulating section 52 is formed in a tube shape including a shaft insertion hole 52A into which the shaft 18 (see FIG. 1) is inserted. An end portion at one axial direction side of the insulating section 52 is formed with an indented portion 52B that is open toward the one axial direction side. A bottom face S1 of the indented portion 52B slopes toward the one axial direction side on progression toward the radial direction outside, and the bottom face S1 of the indented portion 52B is curved in an arc shape in cross-section view.

The depth from an open end to the bottom face S1 of the indented portion 52B thereby gradually becomes shallower on progression toward the radial direction outside. A boss portion 52C formed in a thin tube shape protrudes out at the radial direction inside of the indented portion 52B. A location 52D at the radial direction outside of the indented portion 52B of the insulating section 52 is gently curved, such that there are no step portions or acute angle portions formed between the location 52D and the segments 54, described below.

Each segment 54 is formed by pressing process on a conductive material such as a copper plate, or the like. The segment 54 includes a slide-contact portion 54A, which is formed in a rectangular shape with its length (longitudinal) direction along the axial direction when viewed from the radial direction outside, and which makes sliding contact with the brushes 44 (see FIG. 1), at a radial direction outside face thereof. The segment 54 also includes a pair of fixing portions 54B that project out from the slide-contact portion 54A toward the radial direction inside and that are fixed to the outer peripheral portion of the insulating section 52 by insert molding. The segment 54 also includes an anchor portion 54C extending from an end portion at the one axial direction side of the slide-contact portion 54A toward the radial direction outside. The anchor portion 54C slopes toward the another axial direction side on progression toward the radial direction outside. The plural (18 in the present exemplary embodiment) segments 54 explained above are fixed to the outer peripheral portion of the insulating section 52 in a state arranged at equal spacings therebetween around the circumferential direction.

Figure 5A:
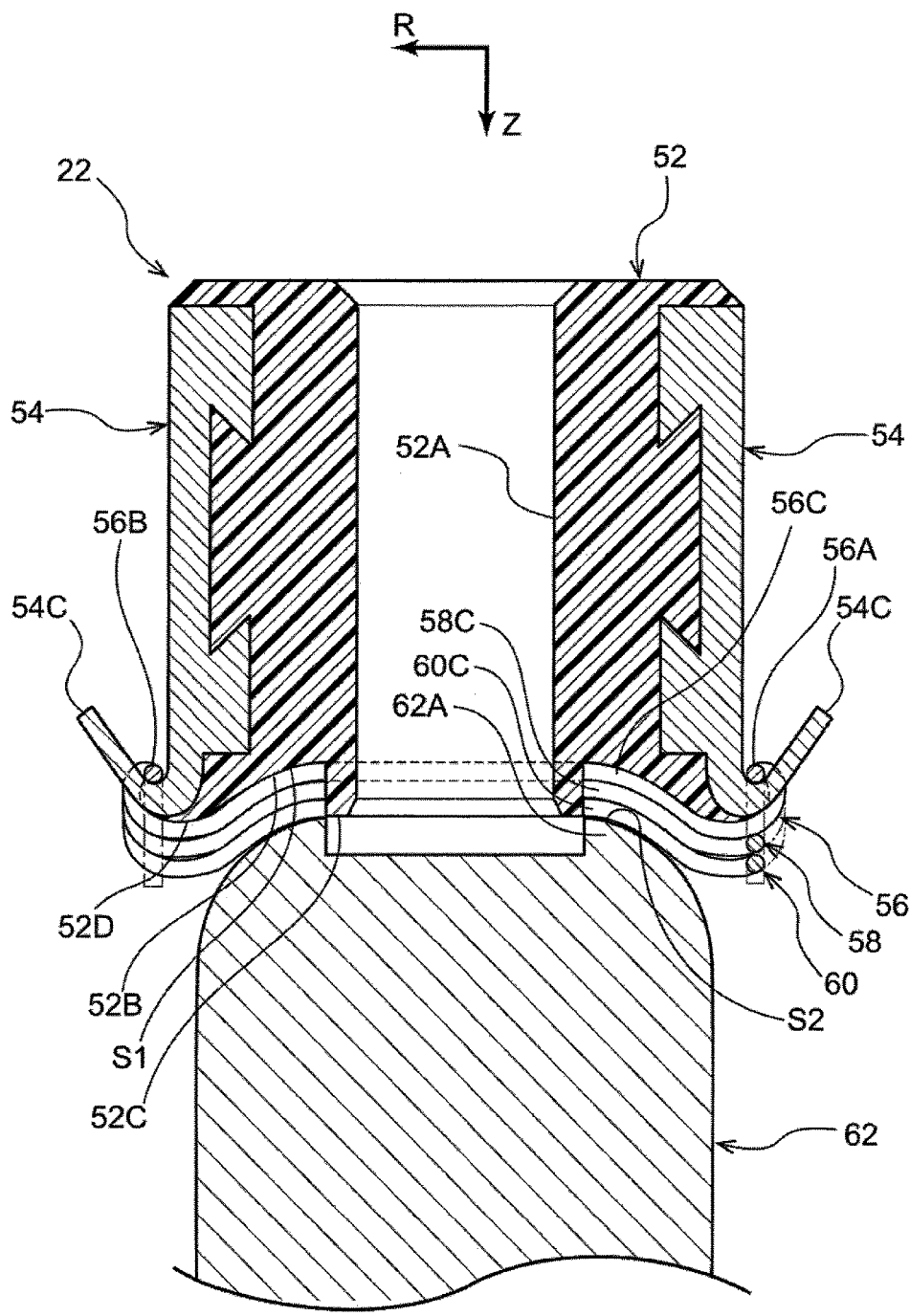
FIG. 5A is a side cross-section schematically illustrating a process of pressing a location between one end portion and another end portion of a third short-circuit wire inside an indented portion.
Figure 5B:
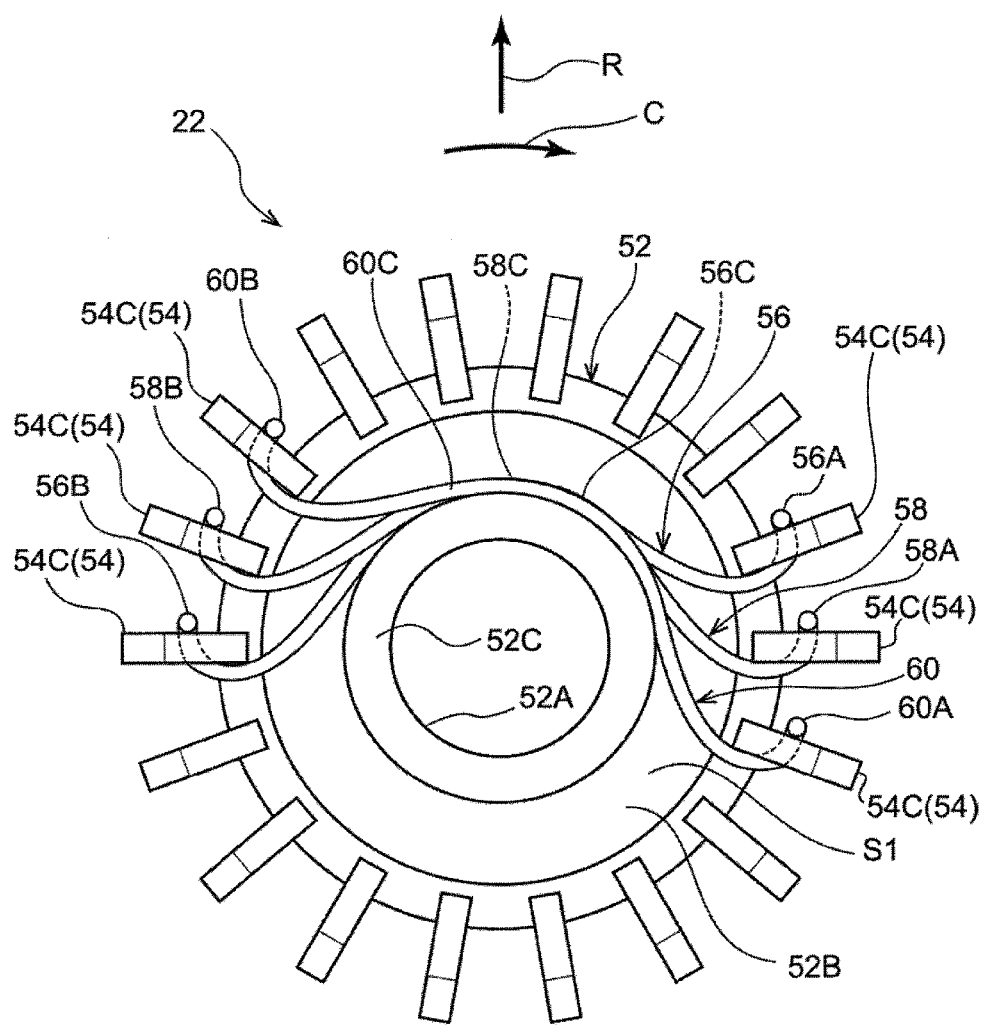
FIG. 5B is a plan view illustrating the third short-circuit wire and so on, after the process illustrated in FIG. 5A has been performed.

As illustrated in FIG. 5B, the first short-circuit wire 56, the second short-circuit wire 58, and the third short-circuit wire 60 are copper wires with an insulating film formed at an outer peripheral face thereof, similarly to the windings (coils) configuring part of the armature 19 (see FIG. 1). The first short-circuit wire 56, the second short-circuit wire 58, and the third short-circuit wire 60 each connect one segment 54 to another segment 54 of the same polarity.

Specifically, one end portion 56A of the first short-circuit wire 56 is anchored to the anchor portion 54C of the respective one segment 54 (the first segment 54), and another end portion 56B of the first short-circuit wire 56 is anchored to the anchor portion 54C of the respective another segment 54 (the second segment 54). Note that the insulating film formed at the one end portion 56A and the another end portion 56B of the first short-circuit wire 56 is shaved away (removed). An intermediate portion 56C between the one end portion 56A and the another end portion 56B of the first short-circuit wire 56 is disposed inside the indented portion 52B formed at the insulating section 52 in a state of being along an outer peripheral face of the boss portion 52C. In the state in which the intermediate portion 56C of the first short-circuit wire 56 is disposed inside the indented portion 52B, the intermediate portion 56C of the first short-circuit wire 56 is separated from the bottom face S1 of the indented portion 52B due to spring-back of the first short-circuit wire 56. Note that the intermediate portion 56C of the first short-circuit wire 56 and the bottom face S1 of the indented portion 52B may abut each other.

One end portion 58A of the second short-circuit wire 58 is anchored to the anchor portion 54C of the respective one segment 54 (the third segment), and another end portion 58B of the second short-circuit wire 58 is anchored to the anchor portion 54C of the respective another segment 54 (the fourth segment). An intermediate portion 58C between the one end portion 58A and the another end portion 58B of the second short-circuit wire 58 is disposed inside the indented portion 52B formed at the insulating section 52 in a state of being along the outer peripheral face of the boss portion 52C. In the state in which the intermediate portion 58C of the second short-circuit wire 58 is disposed inside the indented portion 52B, the intermediate portion 58C of the second short-circuit wire 58 abuts the intermediate portion 56C of the first short-circuit wire 56.

One end portion 60A of the third short-circuit wire 60 is anchored to the anchor portion 54C of the respective one segment 54 (the fifth segment), and another end portion 60B of the third short-circuit wire 60 is anchored to the anchor portion 54C of the respective another segment 54 (the sixth segment). An intermediate portion 60C between the one end portion 60A and the another end portion 60B of the third short-circuit wire 60 is disposed inside the indented portion 52B formed at the insulating section 52 in a state of being along the outer peripheral face of the boss portion 52C. In the state in which the intermediate portion 60C of the third short-circuit wire 60 is disposed inside the indented portion 52B, the intermediate portion 60C of the third short-circuit wire 60 abuts the intermediate portion 58C of the second short-circuit wire 58. The intermediate portions 56C, 58C, 60C of the first short-circuit wire 56, the second short-circuit wire 58, and the third short-circuit wire 60 are thereby disposed overlapping each other in the axial direction of the shaft 18, inside the indented portion 52B formed at the insulating section 52.

Namely, the first short-circuit wire 56 connects the first anchor portion 54C of the first segment 54 to the second anchor portion 54C of the second segment 54, the second short-circuit wire 58 connects the third anchor portion 54C of the third segment 54 to the fourth anchor portion 54C of the fourth segment 54, and the third short-circuit wire 60 connects the fifth anchor portion 54C of the fifth segment 54 to the sixth anchor portion 54C of the sixth segment 54.

Explanation follows regarding a manufacturing method of the commutator 22.

As illustrated in FIG. 2, the plural segments 54 are set inside a specific mold and resin material is poured into the mold to form the insulating section 52 with the plural segments 54 fixed to an outer peripheral portion thereof.

Figure 3A:
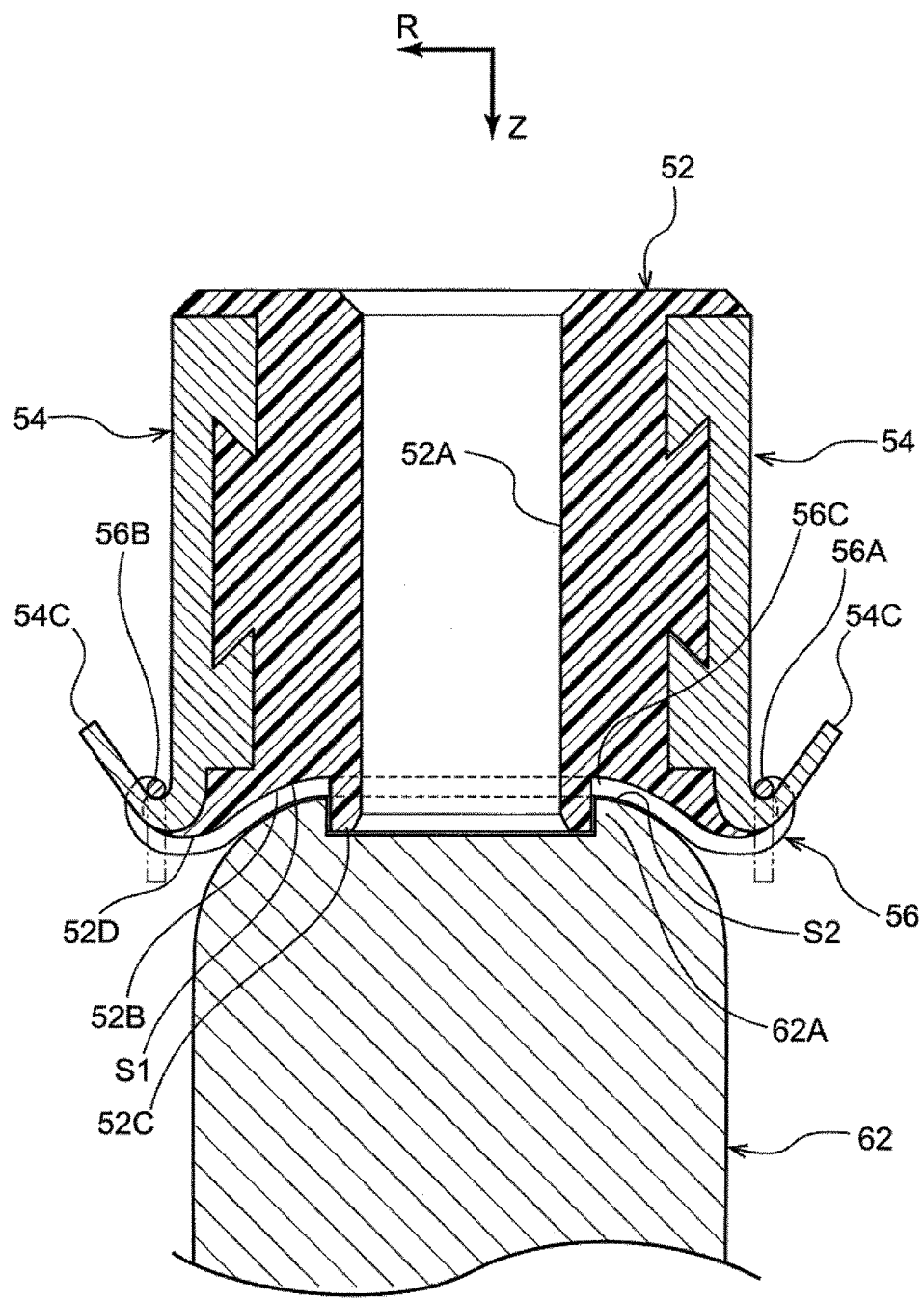
FIG. 3A is a side cross-section schematically illustrating a process of pressing a location between one end portion and another end portion of a first short-circuit wire inside an indented portion.
Figure 3B:
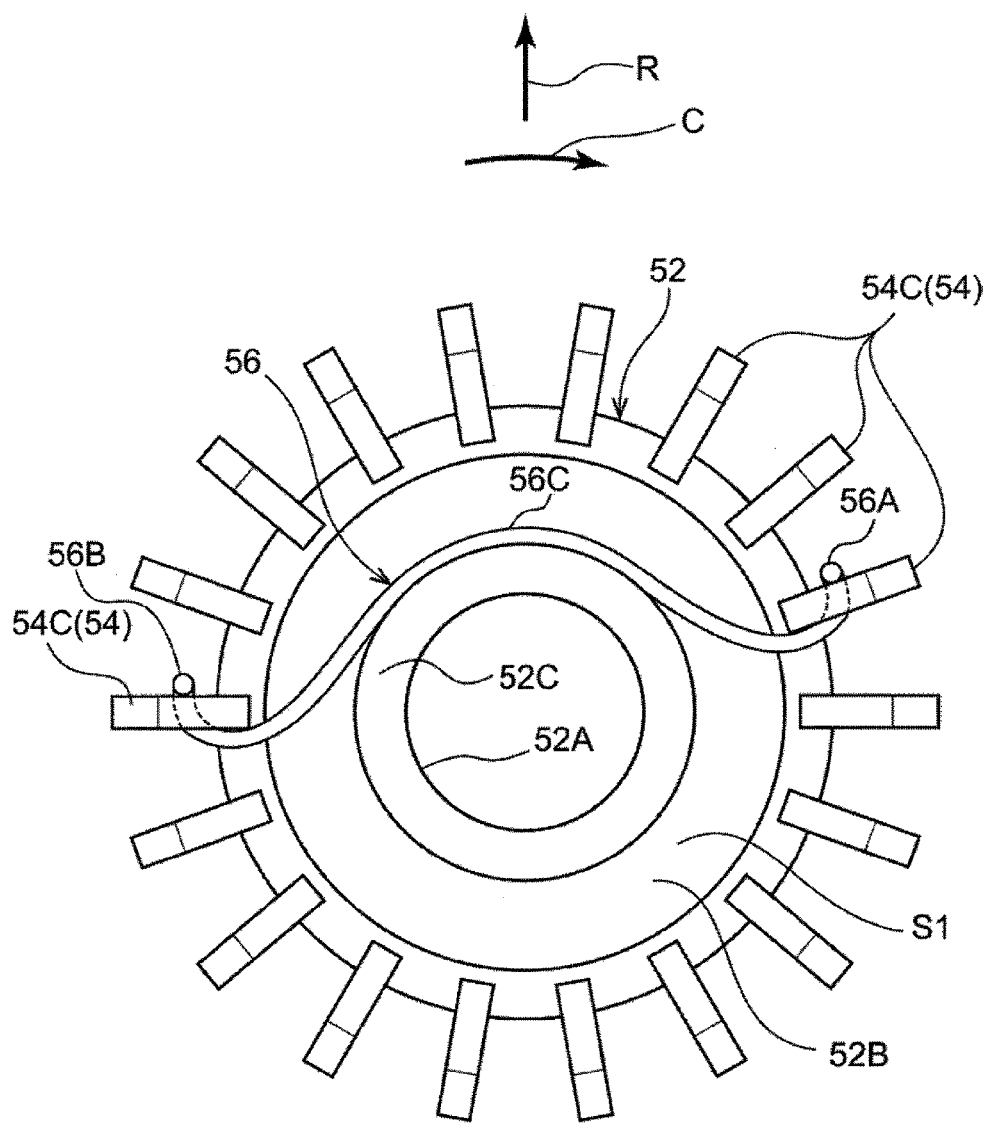
FIG. 3B is a plan view illustrating the first short-circuit wire and so on, after the process illustrated in FIG. 3A has been performed.

Next, as illustrated in FIG. 3A, the one end portion 56A and the another end portion 56B of the first short-circuit wire 56 are respectively anchored to the anchor portion 54C of the respective one segment 54 and the anchor portion 54C of the respective another segment 54 (short-circuit wire anchoring process). After the short-circuit wire anchoring process has been performed, a location between the one end portion 56A and the another end portion 56B of the first short-circuit wire 56 is pressed toward the indented portion 52B side by a jig 62, and the intermediate portion 56C of the first short-circuit wire 56 is made to abut the bottom face S1 of the indented portion 52B (short-circuit wire pressing process). Due to performing the above processes, as illustrated in FIG. 3B, in the state in which the intermediate portion 56C of the first short-circuit wire 56 is disposed inside the indented portion 52B, the respective one segment 54 and the respective another segment 54 are in a state connected by the first short-circuit wire 56. Note that, as illustrated in FIG. 3A, in the present exemplary embodiment, a leading end face S2 of the jig 62 is curved in a shape corresponding to the bottom face S1 of the indented portion 52B formed at the insulating section 52.

Figure 4A:
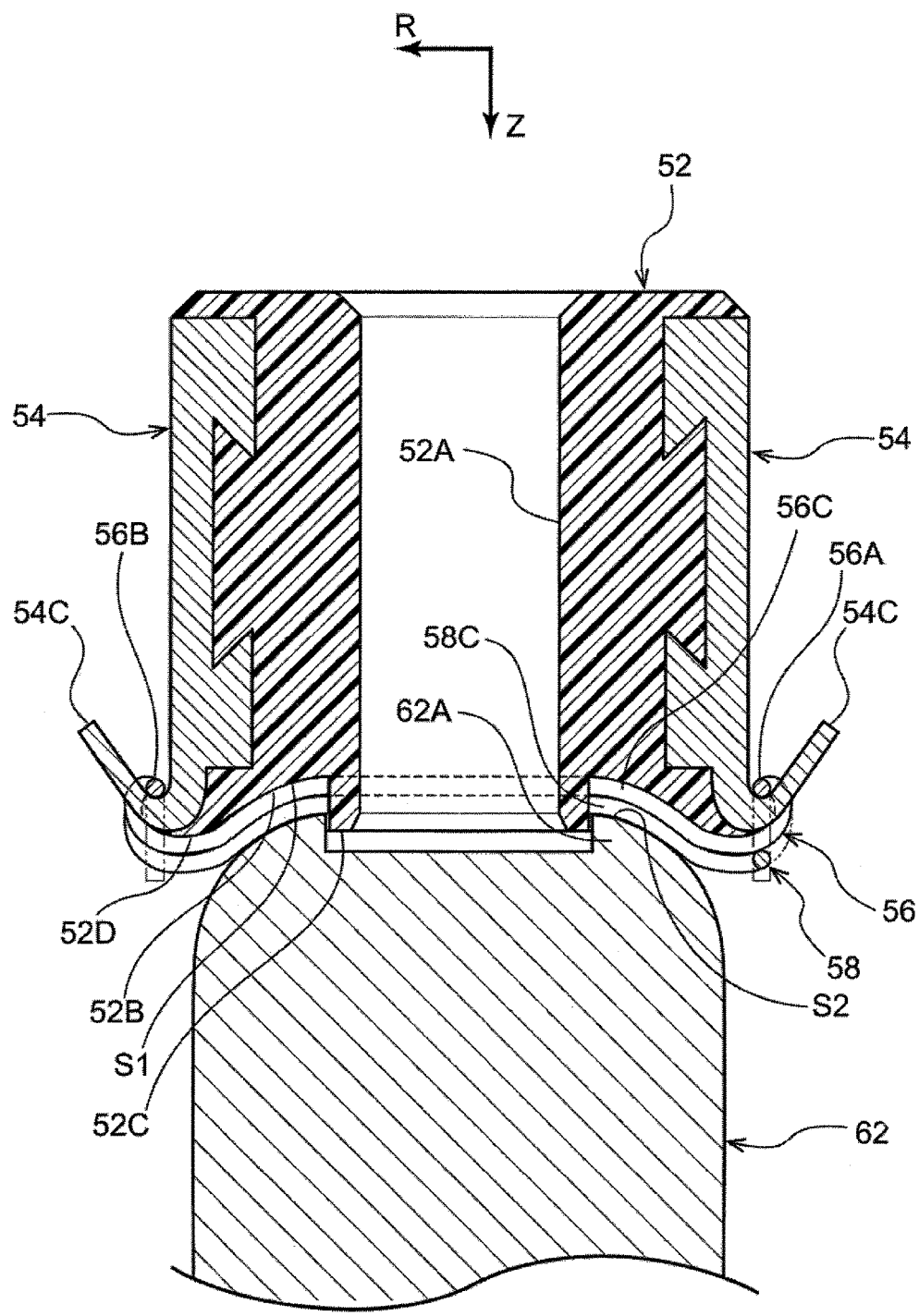
FIG. 4A is a side cross-section schematically illustrating a process of pressing a location between one end portion and another end portion of a second short-circuit wire inside an indented portion.
Figure 4B:
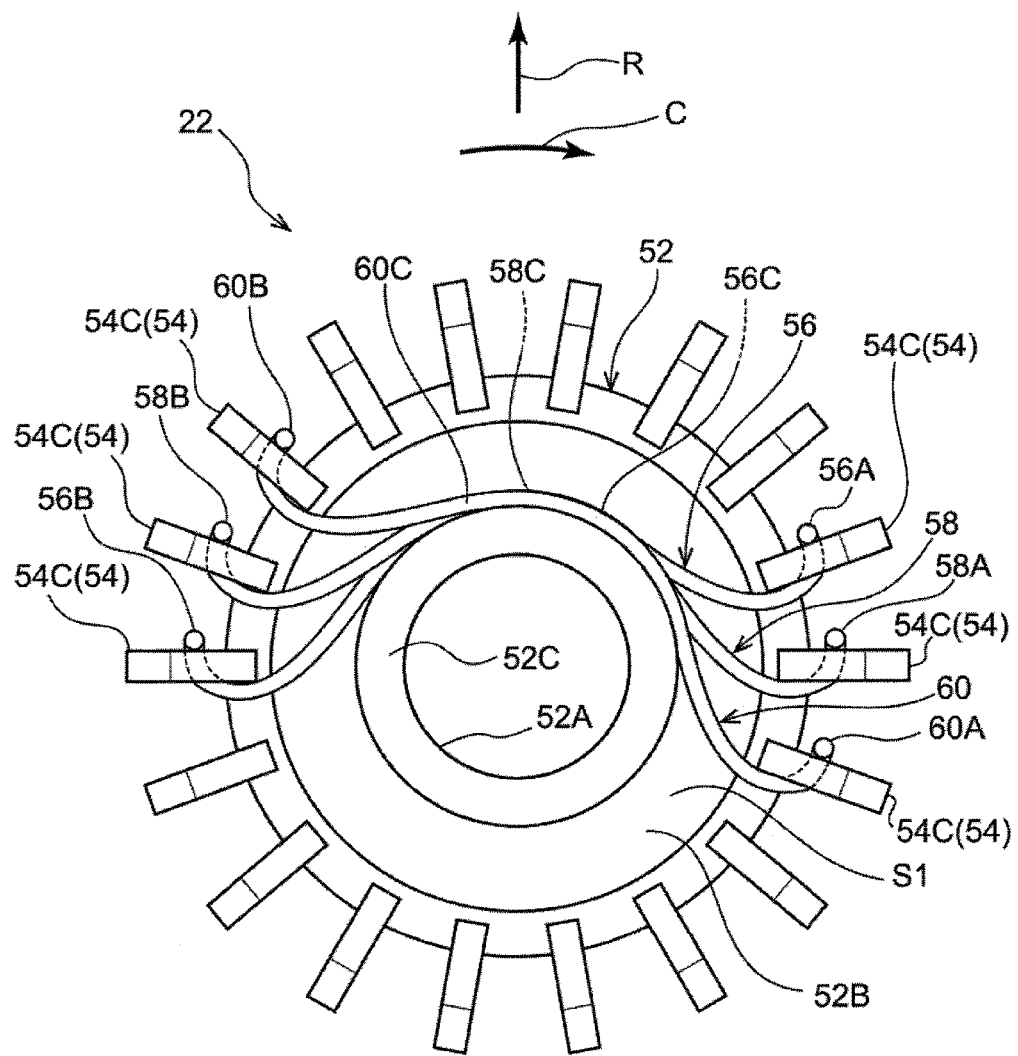
FIG. 4B is a plan view illustrating the second short-circuit wire and so on, after the process illustrated in FIG. 4A has been performed.

Next, as illustrated in FIG. 4A, the one end portion 58A and the another end portion 58B of the second short-circuit wire 58 are respectively anchored to the anchor portion 54C of the respective one segment 54 and the anchor portion 54C of the respective another segment 54 (short-circuit wire anchoring process). After the short-circuit wire anchoring process has been performed, a location between the one end portion 58A and the another end portion 58B of the second short-circuit wire 58 is pressed toward the indented portion 52B side by the jig 62, and the intermediate portion 58C of the second short-circuit wire 58 is made to abut the intermediate portion 56C of the first short-circuit wire 56 (short-circuit wire pressing process). Due to performing the above processes, as illustrated in FIG. 4B, in the state in which the intermediate portion 58C of the second short-circuit wire 58 is disposed inside the indented portion 52B, the respective one segment 54 and the respective another segment 54 are in a state connected by the second short-circuit wire 58.

Next, as illustrated in FIG. 5A, the one end portion 60A and the another end portion 60B of the third short-circuit wire 60 are anchored to the anchor portion 54C of the respective one segment 54 and the anchor portion 54C of the respective another segment 54 (short-circuit wire anchoring process). After the short-circuit wire anchoring process has been performed, a location between the one end portion 60A and the another end portion 60B of the third short-circuit wire 60 is pressed toward the indented portion 52B side by the jig 62, and the intermediate portion 60C of the third short-circuit wire 60 is made to abut the intermediate portion 58C of the second short-circuit wire 58 (short-circuit wire pressing process). Due to performing the above processes, as illustrated in FIG. 5B, in the state in which the intermediate portion 60C of the third short-circuit wire 60 is disposed inside the indented portion 52B, the respective one segment 54 and the respective another segment 54 are in a state connected by the third short-circuit wire 60.

The commutator 22 is manufactured by performing the above processes.

Explanation follows regarding another manufacturing method of the commutator 22.

Figure 6A:
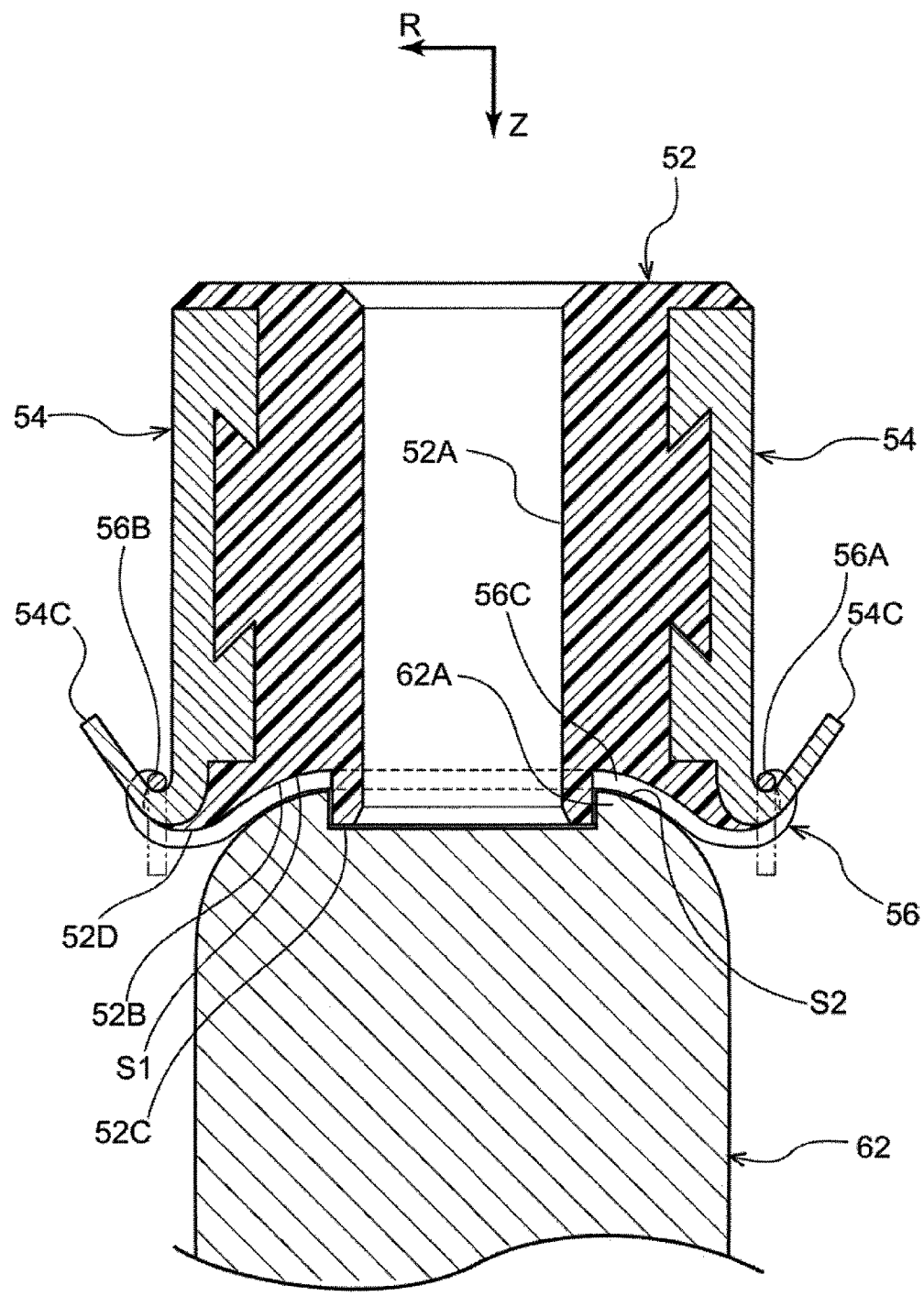
FIG. 6A is a side cross-section schematically illustrating a process of anchoring one end portion and another end portion of a first short-circuit wire to anchor portions of segments, while causing a location between the one end portion and the another end portion of the first short-circuit wire to abut a jig.

After having formed the insulating section 52 with the plural segments 54 fixed to the outer peripheral portion thereof, as illustrated in FIG. 6A, the jig 62 is made to move as far as a position at which clearance corresponding to the wire diameter of the first short-circuit wire 56, the second short-circuit wire 58, and the third short-circuit wire 60 is provided between the leading end face S2 of the jig 62 and the bottom face S1 of the indented portion 52B formed at the insulating section 52. A leading end portion 62A of the jig 62 is thereby disposed inside the indented portion 52B (jig placement process). Next, as illustrated in FIG. 6B, the one end portion 56A and the another end portion 56B of the first short-circuit wire 56 are anchored to the anchor portion 54C of the respective one segment 54 (the first segment) and the anchor portion 54C of the respective another segment 54 (the second segment), while the intermediate portion 56C of the first short-circuit wire 56 is made to abut the leading end face S2 of the jig 62 so that a specific tension is applied (short-circuit wire anchoring process).

Figure 7A:
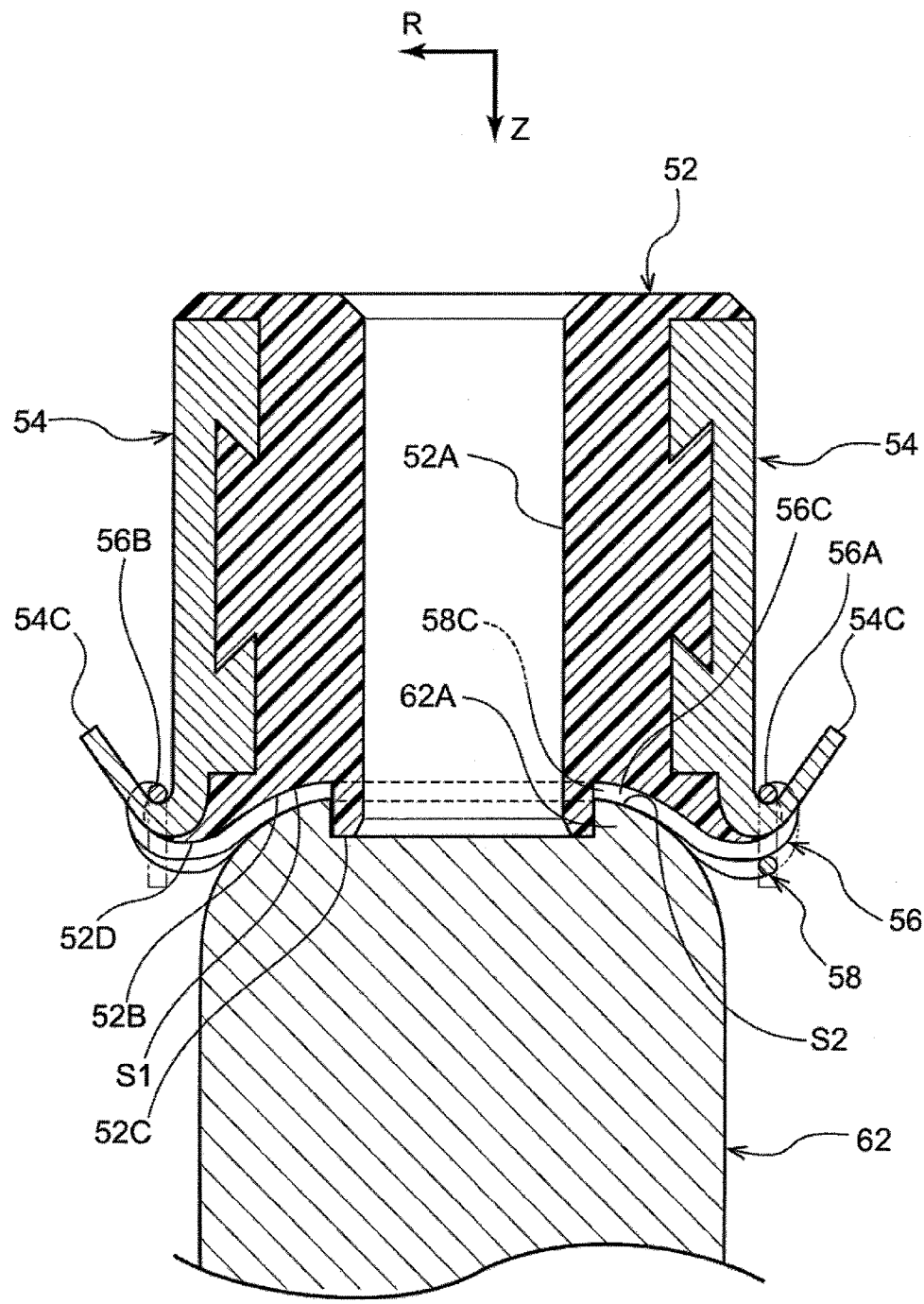
FIG. 7A is a side cross-section schematically illustrating a process of anchoring one end portion and another end portion of a second short-circuit wire to anchor portions of segments, while causing a location between the one end portion and the another end portion of the second short-circuit wire to abut a jig.
Figure 7B:
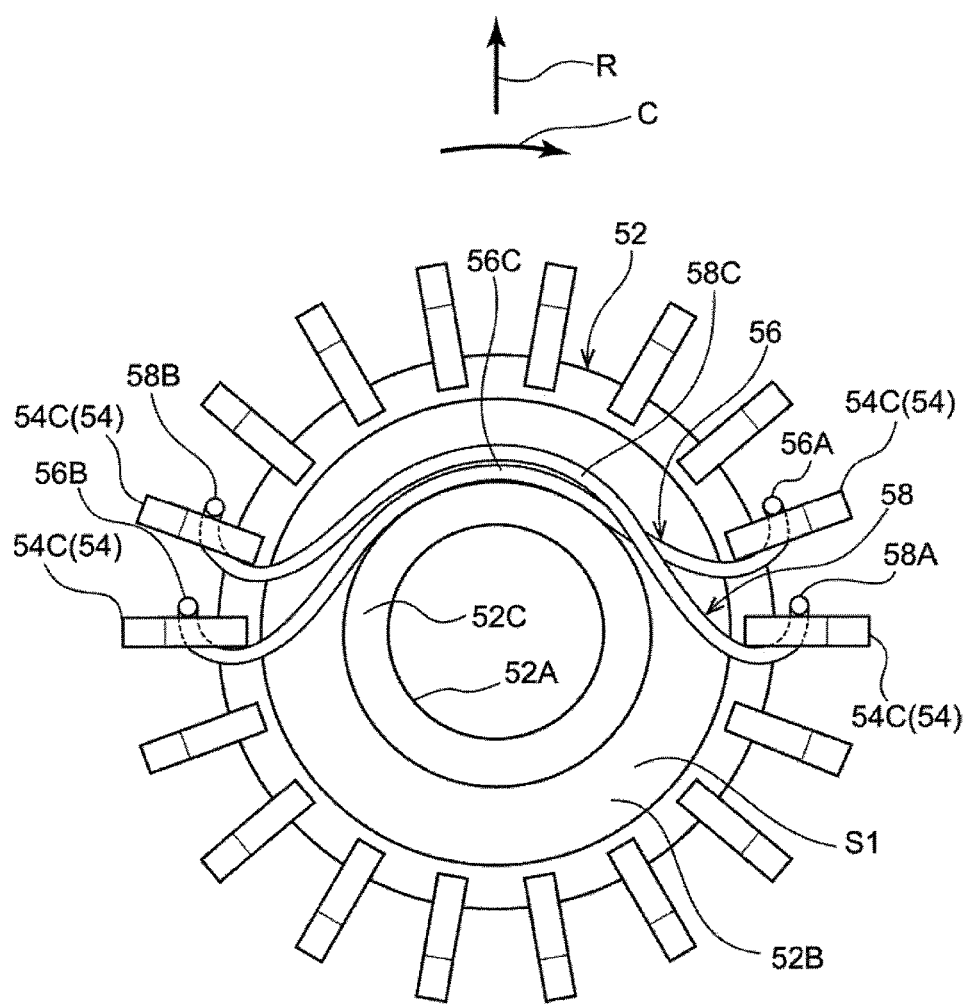
FIG. 7B is a plan view illustrating the second short-circuit wire and so on, after the process illustrated in FIG. 7A has been performed.

Next, as illustrated in FIG. 7A, the intermediate portion 58C of the second short-circuit wire 58 is disposed at the radial direction outside of the first short-circuit wire 56 and made to abut the intermediate portion 56C of the first short-circuit wire 56, while the intermediate portion 58C of the second short-circuit wire 58 is made to abut the leading end face S2 of the jig 62 so that a specific tension is applied. Then, as illustrated in FIG. 7B, the one end portion 58A and the another end portion 58B of the second short-circuit wire 58 are anchored to the anchor portion 54C of the respective one segment 54 (the third segment) and the anchor portion 54C of the respective another segment 54 (the fourth segment) (short-circuit wire anchoring process).

Figure 8A:
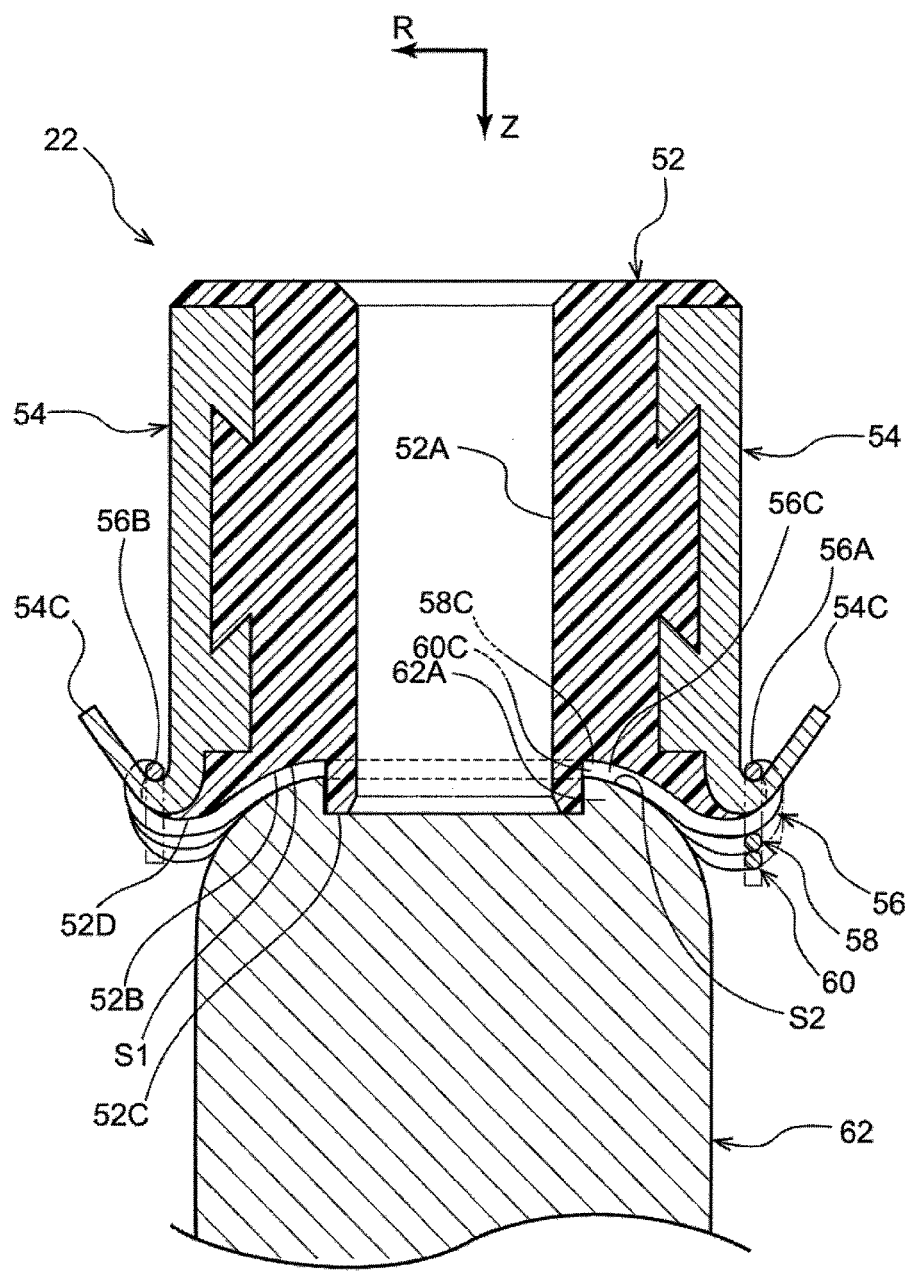
FIG. 8A is a side cross-section schematically illustrating a process of anchoring one end portion and another end portion of a third short-circuit wire to anchor portions of segments, while causing a location between the one end portion and the another end portion of the third short-circuit wire to abut a jig.
Figure 8B:
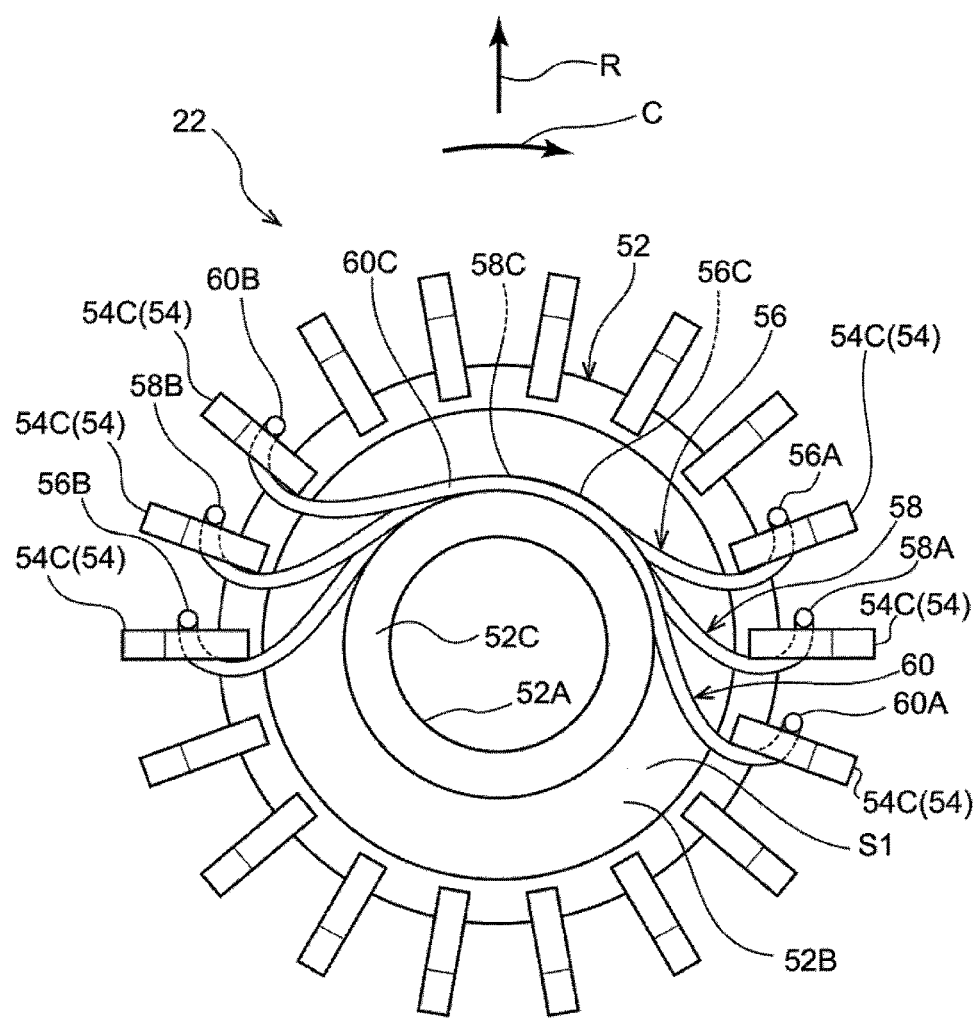
FIG. 8B is a plan view illustrating the third short-circuit wire and so on, after the process illustrated in FIG. 8A has been performed.

Next, as illustrated in FIG. 8A, the intermediate portion 60C of the third short-circuit wire 60 is disposed at the radial direction outside of the second short-circuit wire 58 and made to abut the intermediate portion 58C of the second short-circuit wire 58, while the intermediate portion 60C of the third short-circuit wire 60 is made to abut the leading end face S2 of the jig 62 so that a specific tension is applied. Then, as illustrated in FIG. 8B, the one end portion 60A and the another end portion 60B of the third short-circuit wire 60 are anchored to the anchor portion 54C of the respective one segment 54 (the fifth segment) and the anchor portion 54C of the respective another segment 54 (the sixth segment) (short-circuit wire anchoring process).

Next, after performing the above short-circuit wire anchoring process, the jig 62 is moved in a direction away from the indented portion 52B (jig separation process). Thus, in a state in which the intermediate portions 56C, 58C, 60C of the first short-circuit wire 56, the second short-circuit wire 58, and the third short-circuit wire 60 are disposed inside the indented portion 52B, the respective one segments 54 and the respective another segments 54 are in a state connected together by the first short-circuit wire 56, the second short-circuit wire 58, and the third short-circuit wire 60. The intermediate portions 56C, 58C, 60C of the first short-circuit wire 56, the second short-circuit wire 58, and the third short-circuit wire 60 are disposed overlapping each other in the radial direction of the shaft 18, inside the indented portion 52B formed to the insulating section 52.

Operation and Advantageous Effects of Present Exemplary Embodiment

Explanation follows regarding operation and advantageous effects of the present exemplary embodiment.

In the DC motor 10 illustrated in FIG. 1, the pair of brushes 44 make sliding contact with the segments 54 of the commutator 22, switching the current flow to the windings (coils) wound on the armature core 20. Thus, a magnetic field is generated around the armature core 20, and the rotor 12 rotates due to the interaction between this magnetic field and the magnetic field of the magnets of the stator 16 (the N pole magnets 48 and the S pole magnets 48). Namely, the shaft 18 of the DC motor 10 rotates.

Note that, in the present exemplary embodiment, as illustrated in FIG. 5B and FIG. 8B, the intermediate portions 56C, 58C, 60C of the first short-circuit wire 56, the second short-circuit wire 58, and the third short-circuit wire 60 that connect together the anchor portions 54C of the respective one segments 54 and the anchor portions 54C of the respective another segments 54 are disposed inside the indented portion 52B formed to the insulating section 52. This enables the space where the short-circuit wires (the first short-circuit wire 56, the second short-circuit wire 58, and the third short-circuit wire 60) are disposed, between the commutator 22 and the armature 19 attached to the shaft 18, to be reduced. Namely, the insulating section 52 of the commutator 22 and the armature 19 can be disposed closer to each other than in a commutator 64 according to a comparative example which is illustrated in FIG. 9. This enables the rotor 12 and the DC motor 10 configured including the commutator 22 of the present exemplary embodiment to be reduced in size in the axial direction.

In the present exemplary embodiment, as illustrated in FIG. 5B, the intermediate portions 56C, 58C, 60C of the first short-circuit wire 56, the second short-circuit wire 58, and the third short-circuit wire 60 are disposed overlapping each other in the axial direction inside the indented portion 52B formed to the insulating section 52. As illustrated in FIG. 8B, the intermediate portions 56C, 58C, 60C of the first short-circuit wire 56, the second short-circuit wire 58, and the third short-circuit wire 60 are disposed overlapping each other in the radial direction inside the indented portion 52B formed to the insulating section 52. Disposing the intermediate portions 56C, 58C, 60C of the first short-circuit wire 56, the second short-circuit wire 58, and the third short-circuit wire 60 as described above enables the space factor of the short-circuit wires (the first short-circuit wire 56, the second short-circuit wire 58, and the third short-circuit wire 60) inside the indented portion 52B of the insulating section 52 to be higher (improved).

In the present exemplary embodiment, as illustrated in FIG. 2, the location 52D which is at the radial direction outside of the indented portion 52B in the insulating section 52 is gently curved, thereby enabling the load on the first short-circuit wire 56, the second short-circuit wire 58, and the third short-circuit wire 60 due to portions of the first short-circuit wire 56, the second short-circuit wire 58, and the third short-circuit wire 60 abutting the location 52D to be reduced. In other words, the first short-circuit wire 56, the second short-circuit wire 58, and the third short-circuit wire 60 can be prevented from bending in an acute angle about the location 52D when the first short-circuit wire 56, the second short-circuit wire 58, and the third short-circuit wire 60 are routed (disposed) along the location 52D.

As illustrated in FIG. 3A and so on, in the present exemplary embodiment, the leading end face S2 of the jig 62 is curved in a shape corresponding to the bottom face S1 of the indented portion 52B formed at the insulating section 52. The load on the first short-circuit wire 56, the second short-circuit wire 58, and the third short-circuit wire 60 due to being pressed by the jig 62 can accordingly be reduced.

Note that an example has been explained in the present exemplary embodiment in which the commutator 22 is manufactured by the manufacturing methods illustrated in FIG. 3A to FIG. 8B; however, the present invention is not limited thereto. For example, the commutator 22 may be manufactured by, after having performed the short-circuit wire anchoring process in which the one end portions 56A, 58A, 60A and the another end portions 56B, 58B, 60B of the first short-circuit wire 56, the second short-circuit wire 58, and the third short-circuit wire 60 are anchored to the anchor portions 54C of the respective plural segments 54, performing the short-circuit wire pressing process in which the intermediate portions 56C, 58C, 60C of the first short-circuit wire 56, the second short-circuit wire 58, and the third short-circuit wire 60 are disposed inside the indented portion 52B by pressing collectively the intermediate portions 56C, 58C, 60C (pressing the intermediate portions 56C, 58C, 60C together) of the first short-circuit wire 56, the second short-circuit wire 58, and the third short-circuit wire 60 using the jig 62. In this manufacturing method, the intermediate portions 56C, 58C, 60C of the first short-circuit wire 56, the second short-circuit wire 58, and the third short-circuit wire 60 are collectively pressed using the jig 62, thereby enabling the disposal process of the intermediate portions 56C, 58C, 60C of the first short-circuit wire 56, the second short-circuit wire 58, and the third short-circuit wire 60 inside the indented portion 52B to be simplified.

The commutator 22 illustrated in FIG. 8B may be manufactured by the manufacturing method illustrated in FIG. 3A to FIG. 5B.

In the present exemplary embodiment, an example has been explained in which the boss portion 52C is provided at the insulating section 52 in order to suppress the intermediate portions 56C, 58C, 60C of the first short-circuit wire 56, the second short-circuit wire 58, and the third short-circuit wire 60 from contacting the shaft 18; however, the present invention is not limited thereto. For example, a configuration that is not provided with the boss portion 52C may be applied in a case in which the shaft 18 is short in length, and the intermediate portions 56C, 58C, 60C of the first short-circuit wire 56, the second short-circuit wire 58, and the third short-circuit wire 60 are not in contact with the shaft 18.

In the present exemplary embodiment, examples have been explained in which the intermediate portions 56C, 58C, 60C of the first short-circuit wire 56, the second short-circuit wire 58, and the third short-circuit wire 60 are disposed overlapping each other in the axial direction or in the radial direction inside the indented portion 52B formed at the insulating section 52; however, the present invention is not limited thereto. For example, the intermediate portions 56C and 58C of the first short-circuit wire 56 and the second short-circuit wire 58 are disposed overlapping each other in the axial direction, and the intermediate portions 56C and 60C of the first short-circuit wire 56 and the third short-circuit wire 60 are disposed overlapping each other in the radial direction, inside the indented portion 52B formed at the insulating section 52. Placement of the intermediate portions 56C, 58C, 60C of the first short-circuit wire 56, the second short-circuit wire 58, and the third short-circuit wire 60 may be set as appropriate in consideration of the size of the indented portion 52B, and so on.

In the present exemplary embodiment, an example has been explained in which portions of the first short-circuit wire 56, the second short-circuit wire 58, and the third short-circuit wire 60 are disposed inside the indented portion 52B formed at the insulating section 52; however, the present invention is not limited thereto. For example, a configuration may be applied in which the entire first short-circuit wire 56, second short-circuit wire 58, and third short-circuit wire 60 are disposed inside the indented portion 52B formed at the insulating section 52.

In the present exemplary embodiment, an example has been explained in which three short-circuit wires (the first short-circuit wire 56, the second short-circuit wire 58, and the third short-circuit wire 60) are provided; however, the present invention is not limited thereto. The number of short-circuit wires may be set as appropriate in consideration of the number of magnets 48 configuring the stator 16, and so on.

An exemplary embodiment of the present invention has been explained above; however, the present invention is not limited to the above explanation, and obviously various other modifications may be implemented within a range not departing from the scope thereof.

What is claimed is:

1. A commutator comprising:
   an insulating section that is formed in a tube shape and that includes a shaft insertion hole through which a shaft is inserted, an indented portion being formed at an end portion of the insulating section, which is at one side in an axial direction of the shaft;
   a plurality of segments that are supported at an outer peripheral portion of the insulating section and that are arrayed with a spacing from each other along a circumferential direction of the insulating section, an anchor portion being provided at an end portion of each of the segments, which is at the one side in the axial direction of the shaft; and
   a short-circuit wire that connects the anchor portion of one of the segments and the anchor portion of another one of the segments, at least a portion of the short-circuit wire being disposed inside the indented portion.

2. The commutator of claim 1, wherein:
   a plurality of short-circuit wires are provided; and
   at least portions of the respective plurality of the short-circuit wires are disposed overlapping in at least one direction of the axial direction or a radial direction of the shaft, inside the indented portion.

3. A motor comprising:
   an armature that includes an armature core fixed to a shaft, and a coil that is formed by a conductive winding being wound about a specific location of the armature core; and
   a commutator to which a terminal portion of the winding forming the coil is connected, the commutator comprising:
   an insulating section that is formed in a tube shape and that includes a shaft insertion hole through which the shaft is inserted, an indented portion being formed at an end portion of the insulating section, which is at one side in an axial direction of the shaft;
   a plurality of segments that are supported at an outer peripheral portion of the insulating section and that are arrayed with a spacing from each other along a circumferential direction of the insulating section, an anchor portion being provided at an end portion of each of the segments, which is at the one side in the axial direction of the shaft; and
   a short-circuit wire that connects the anchor portion of one of the segments and the anchor portion of another one of the segments, at least a portion of the short-circuit wire being disposed inside the indented portion.

4. The motor of claim 3, wherein:
   a plurality of short-circuit wires are provided; and
   at least portions of the respective plurality of the short-circuit wires are disposed overlapping in at least one direction of the axial direction or a radial direction of the shaft, inside the indented portion.

5. A manufacturing method of a commutator comprising:
   an insulating section that is formed in a tube shape and that includes a shaft insertion hole through which a shaft is inserted, an indented portion being formed at an end portion of the insulating section, which is at one side in an axial direction of the shaft;
   a plurality of segments that are supported at an outer peripheral portion of the insulating section and that are arrayed with a spacing from each other along a circumferential direction of the insulating section, an anchor portion being provided at an end portion of each of the segments, which is at the one side in the axial direction of the shaft; and
   a plurality of short-circuit wires each of which connects the anchor portion of one of the segments and the anchor portion of another one of the segments, at least a portion of each of the respective short-circuit wires being disposed inside the indented portion,
   the manufacturing method comprising:
   a short-circuit wire anchoring process of anchoring one end portions and other end portions of the short-circuit wires to the respective anchor portions of the segments; and
   a short-circuit wire pressing process of disposing the at least a portion of each of the respective short-circuit wires inside the indented portion, by pressing locations between the one end portions and the other end portions of the short-circuit wires toward an indented portion side by using a jig, after performing the short-circuit wire anchoring process.

6. The manufacturing method of claim 5, wherein at least portions of the respective plurality of the short-circuit wires are disposed overlapping in at least one direction of the axial direction or a radial direction of the shaft, inside the indented portion.

7. A manufacturing method of a commutator comprising:
an insulating section that is formed in a tube shape and that includes a shaft insertion hole through which a shaft is inserted, an indented portion being formed at an end portion of the insulating section, which is at one side in an axial direction of the shaft;
a plurality of segments that are supported at an outer peripheral portion of the insulating section and that are arrayed with a spacing from each other along a circumferential direction of the insulating section, an anchor portion being provided at an end portion of each of the segments, which is at the one side in the axial direction of the shaft; and
a plurality of short-circuit wires each of which connects the anchor portion of one of the segments and the anchor portion of another one of the segments, at least a portion of each of the respective short-circuit wires being disposed inside the indented portion,
the manufacturing method comprising:
a jig placement process of disposing a leading end portion of a jig inside the indented portion;
a short-circuit wire anchoring process of anchoring one end portions and other end portions of the short-circuit wires to the respective anchor portions of the segments, while causing locations between the one end portions and the other end portions of the short-circuit wires to abut the jig; and,
a jig separation process of moving the jig in a direction away from the indented portion after performing the short-circuit wire anchoring process.

8. The manufacturing method of claim 7, wherein at least portions of the respective plurality of the short-circuit wires are disposed overlapping in at least one direction of the axial direction or a radial direction of the shaft, inside the indented portion.

9. The manufacturing method of claim 7, wherein
in the short-circuit wire anchoring process, the locations between the one end portions and the other end portions of the short-circuit wires are disposed overlapping in a radial direction of the shaft.

10. The manufacturing method of claim 9, wherein
the short-circuit wire anchoring process is performed in a state in which, in the jig placement process, a clearance corresponding to a wire diameter of the short-circuit wire is provided between the jig and the indented portion.

* * * * *